United States Patent [19]

Howard

[11] Patent Number: 4,964,842
[45] Date of Patent: Oct. 23, 1990

[54] TWO PIECE POWER TRANSMISSION COMPONENT

[75] Inventor: Billy G. Howard, Arlington, Tex.

[73] Assignee: Martin Sprocket and Gear

[21] Appl. No.: 393,055

[22] Filed: Aug. 10, 1989

Related U.S. Application Data

[63] Continuation of Ser. No. 235,104, Aug. 23, 1988, abandoned.

[51] Int. Cl.⁵ ............................................. F16H 55/30
[52] U.S. Cl. ..................................... 474/152; 474/96
[58] Field of Search ................................. 474/95–99, 474/152; 403/344, 339, 340

[56] References Cited

U.S. PATENT DOCUMENTS

| | | | |
|---|---|---|---|
| 403,857 | 5/1889 | Reeves | 474/96 |
| 416,575 | 12/1889 | Davey | 474/96 |
| 470,952 | 3/1892 | Scholfield | 474/96 |
| 470,953 | 3/1892 | Scholfield | 474/97 |
| 1,359,822 | 11/1920 | Misener | 474/96 |
| 1,391,719 | 9/1921 | Conyngham . | |
| 1,431,374 | 10/1922 | Cullman . | |
| 2,382,740 | 8/1945 | Noffsinger | 74/243 |
| 2,451,690 | 10/1948 | Oehler | 74/243 |
| 2,465,570 | 3/1949 | Bocchino | 74/243 |
| 3,005,356 | 10/1961 | Gandrud | 74/230.11 |
| 3,016,101 | 10/1963 | Harriman | 74/243 |
| 3,083,585 | 4/1963 | Dawe et al. | 74/243 |
| 3,097,541 | 7/1963 | Kindig | 74/243 |
| 3,106,101 | 10/1963 | Harriman | 474/96 |
| 3,111,859 | 11/1963 | Malone | 74/243 |
| 3,159,047 | 12/1964 | Dable | 74/450 |
| 4,031,769 | 6/1977 | Kassing | 74/243 |
| 4,043,214 | 8/1977 | Westlake | 741/243 |
| 4,127,038 | 11/1978 | Browning | 74/217 B |
| 4,253,344 | 3/1981 | Kerklies | 474/96 |
| 4,506,559 | 3/1985 | Francke et al. | 74/439 |
| 4,645,476 | 2/1987 | King et al. | 474/153 |
| 4,674,549 | 6/1987 | Bush | 403/340 |

Primary Examiner—Jerome W. Massie, IV
Assistant Examiner—Gay Ann Spahn

[57] ABSTRACT

A two piece power transmission component manufactured in segments, each segment having a central opening for assembly around a shaft, a pair of fastener flanges and mating sockets, each having a fastener flange and a mating locking ridge to facilitate assembly and mating holes formed axially with the central opening for convenient operation of a fastener such as a bolt and a mating nut, each socket and fastener flange has multiple, engaging thrust surfaces to enable the assembly to withstand large forces and the bolt head and nut, when assembled, are in recessed portions of the segments such that they do not extend past the outer surfaces of the assembled segments.

3 Claims, 3 Drawing Sheets

0
TWO PIECE POWER TRANSMISSION COMPONENT

This application is a continuation of application Ser. No. 07/235,104, filed Aug. 23, 1988, abandoned.

BACKGROUND OF THE INVENTION

1. Field of the Invention

This invention relates in general to power transmission components such as timing belt pulleys, table top sprockets and gears, especially to those in two pieces that facilitate convenient assembly around a shaft located near a table top or conveyor surface.

2. Description of the Prior Art

There are a variety of machines which utilize timing belt pulleys, sprockets and gears which are assembled on shafts that cannot be easily moved. Such arrangements are often found in conveyor systems and, in the event of the need for replacement of a power transmission component, the supporting shaft cannot be conveniently moved. To do so often requires stopping an assembly line at a very expensive cost to the manufacturer. For this reason, a variety of two-piece power transmission components have been developed in the past which, when divided, can be assembled around a shaft without its removal.

The two-piece power transmission components of the past have some significant disadvantages, one being the lack of a satisfactory self-aligning and locking feature to promote ease and accuracy of assembly. Some have fastener arrangements which are difficult to reach and manipulate due to the inconvenient location of the power transmission component beneath the surface of a table or a conveyor.

SUMMARY OF THE INVENTION

It is therefore the general object of this invention to provide an improved two-piece power transmission component that may be conveniently and accurately installed in difficult to reach locations such as beneath a table or conveyor top.

The objects of the invention are achieved by the provision of a two-piece power transmission component having first and second segments, the two segments forming a continuous toothed power transmission component outer periphery. A transverse web extends across each segment to form a central shaft receiving opening. A pair of fastener flanges extend outwardly from a face of the transverse web between the central opening and the outer periphery. Each flange has a tapered, axially-extending lock that mates with a tapered lock on an opposed flange of the mating segment to pull the segments together and prevent separation. Further, each flange has an axially-extending fastener hole that mates with a similar hole in the opposed flange. Finally, a fastener is secured between each pair of fastener holes to pull the segments together on both the axial and transverse direction.

DESCRIPTION OF THE PREFERRED EMBODIMENT

Figure 1:
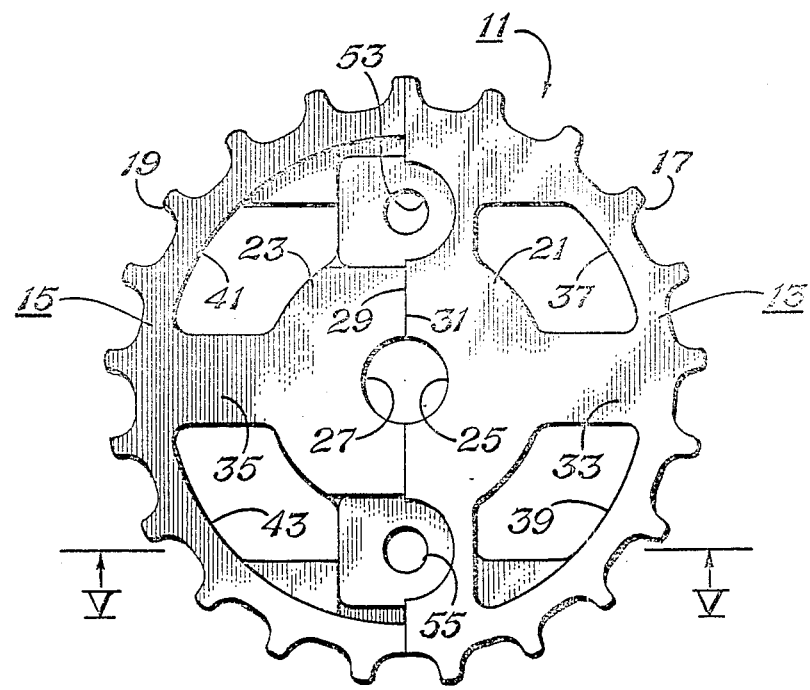
FIG. 1 is a plan view of a two-piece power transmission component constructed according to the principles of the invention.

The numeral 11 in the drawing designates a pair of two-piece power transmission component segments 13, 15, each having a continuous and toothed power transmission component outer periphery 17, 19 that, when the segments are mated, form a conventional power transmission component configuration.

A transverse web 21, 23 extends across each of the segments to form a portion 25, 27 of a shaft receiving inner periphery. The webs 21, 23 have abutting faces 29, 31 on either side of the shaft hole and may have additional support bars 33, 35. One segment has weight-reducing apertures 37, 39 and the other has similar openings 41, 43.

Figures 2, 3:
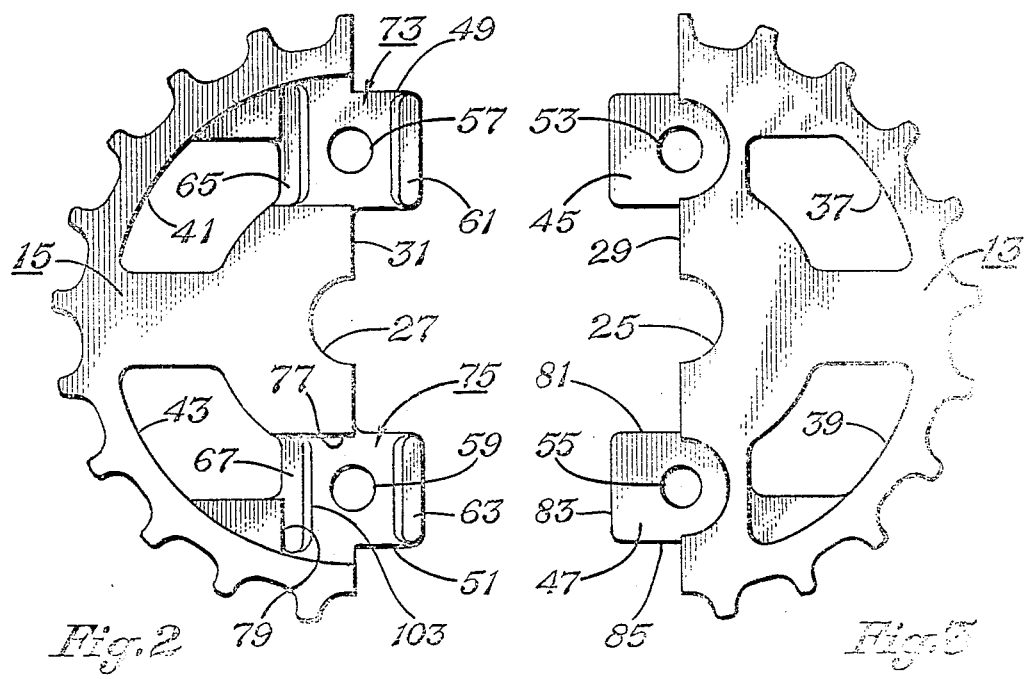
FIG. 2 is a view of one-half or one piece of the power transmission component of FIG. 1.
FIG. 3 is a plan view of the other segment or half of the power transmission component of FIG. 1.

As seen in FIGS. 2 and 3, each of the segments 13, 15 has a pair of fastener flanges designated by the numeral 45, 47 for segment 13 and by the numeral 49, 51 for the segment 15. Each of the flanges has an axially-extending fastener hole designated by the numerals 53, 55 for segment 13 and by the numerals 57, 59 for the segment 15.

Figure 5:
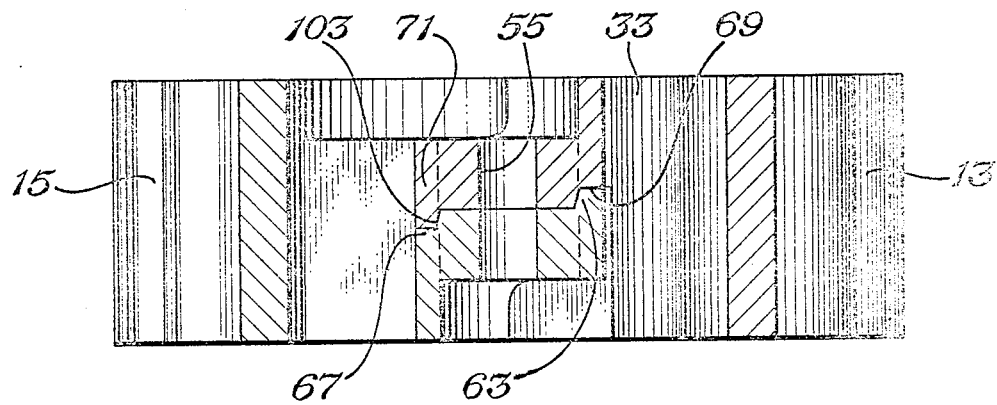
FIG. 5 is a sectional view as seen looking along the lines V—V of FIG. 1.

Further, each of the segments 13, 15 have a locking means such that when the two are engaged they tend to remain assembled even before being securely fastened. As shown in FIG. 2, segment 15 has a pair of upwardly protruding tapered locking ridges 61, 63 and a pair of parallel tapered locking depressions 65, 67. Segment 13 of FIG. 3 has similar locking ridges in segment which are not visible since they are underneath the segments as viewed in FIG. 3. When the two segments are engaged, as indicated in FIG. 5, the locking ridge or protrusion 63 and the locking depression 67 engage the mating locking depression 69 and the locking ridge 71 of segment 13 each ridge and depression tapered as indicated by the numeral 103 in FIG. 5. Although not shown in the drawings, the fastener flange 45 of segment 13 has locking ridges and depressions similar to those just described in connection with fastener flange 47.

From the above description it will be seen that the fastener flanges 45, 47 of segment 13 engage a socket 73, 75 of FIG. 2, each of the sockets having the previously described locking ridges and depression and in addition a plurality of thrust faces indicated by the numerals 77, 79 on socket 75 of segment 15 in FIG. 2 and faces 81, 83 and 85 associated with fastener flange 47 of segment 13 in FIG. 3.

Figure 4:
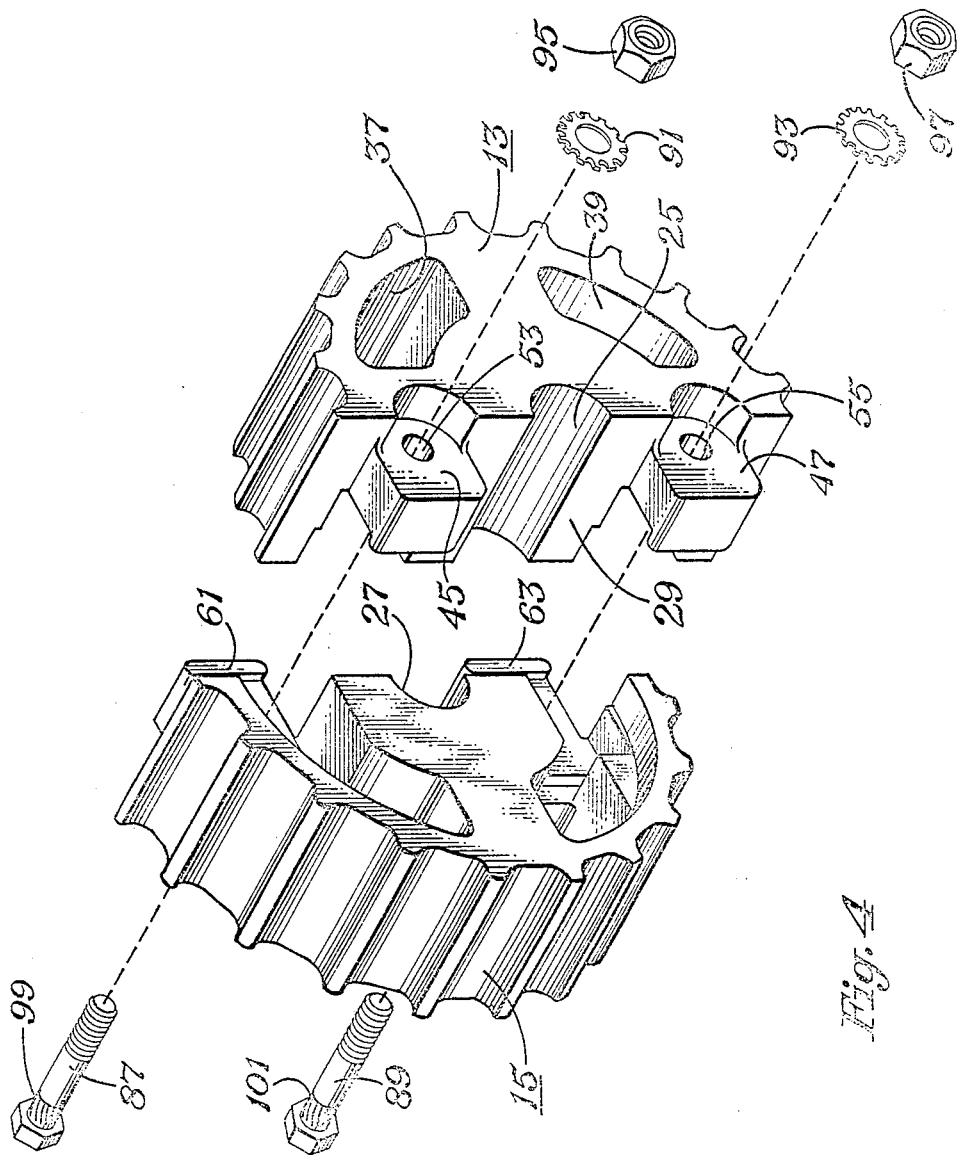
FIG. 4 is a perspective, exploded view of the two-piece power transmission component of FIG. 1, showing additional detail of the segments and the fasteners used to assemble them.

As indicated in the exploded view of FIG. 4 fasteners which are here represented as bolts 87, 89 are aligned with the previously described bolt hole 53, 57 and 55, 59 and assembled with lock washer 91, 93 and nuts 95, 97.

For the purpose of reducing weight in the assembly windows 99, 101 are formed in segment 13 and windows 103, 105 formed in segment 15.

In operation the two segments 13, 15 are initially separated for assembly around a difficult to reach shaft of the type that is often located beneath a table top or a conveyor in a factory. The two segments 13, 15 are brought together until the thrust faces associated with the fastener flanges 47, 49 and sockets 73, 75 are partially engaged. Then the segments 13, 15 are moved axially to engage the mating locking ridges 63, 71 (FIG. 5) with the depressions 69, 67. With the segment thus locked, a repairman can easily hold the assembly on the shaft for the installation of the bolts 87, 89 with the lock washers 91, 93 and the nuts 95, 97. The bolts 87, 89 may be knurled as indicated by the numerals 99, 101 to provide some grip with the mating hole during assembly for the convenience of the repairman. Once the assembly has been connected with the fastener, an exceptionally strong power transmission component has been provided. The use of the fastener flanges 45, 47 and mating sockets 49, 51, with their locking ridges and depressions makes assembly relatively easy. In addition, the use of bolt holes and bolts which are assembled axially with the shaft hole defined by portions 25, 27 of FIG. 1 is an added convenience for the repairman. Also, the use of the multiple thrust faces associated with the fastener flanges 45, 47 and sockets 73, 75 enable the assembled power transmission component to withstand large loading without risk of failure.

The invention has been shown in only one of its forms. It should be apparent to those skilled in the art that it is not so limited, but is susceptible to various changes and modifications without departing from the spirit thereof.

I claim:

1. A two piece power transmission component manufactured in segments for convenient assembly around a shaft near the surface of a machine, comprising:
   a first segment and second segment of selected thickness;
   the two segments forming when mated a continuous toothed power transmission component outer periphery;
   a transverse web extending across each segment to form a central, shaft receiving opening;
   a pair of fastener flanges, having a thickness less than that of the associated segments, extending outwardly from the transverse web of each segment between the central opening and the outer periphery, each flange having a planar surface and at least one transverse surface to overlap with a mating flange of an opposed segment to axially and transversely align the segments;
   each flange having a tapered axially extending locking ridge that mates with a mating tapered locking depression on an opposed flange of the mating segment to pull the segments together and to prevent separation of the segments when assembled by hand to hold the assembly for installation of fasteners;
   each flange having an axially extending fastener hole mating with a paired, similar hole in the opposed flange;
   a fastener extending between each paired fastener hole.

2. A two piece power transmission component manufactured in segments for convenient assembly around a shaft near the surface of a machine, comprising:
   a first segment and second segment of selected thickness;
   the two segments forming when mated a continuous toothed power transmission component outer periphery;
   a transverse web extending across each segment to form a central, shaft receiving opening;
   a pair of fastener flanges, having a thickness less than that of the associated segments, extending outwardly from the transverse web of each segment between the central opening and the outer periphery, each flange having a planar surface and at least one transverse surface to overlap with a mating flange of an opposed segment to axially and transversely align the segments;
   a pair of sockets on each segment to receive a mating fastener flange and form plural thrust faces to transmit load and torque;
   the sockets including a tapered axially extending locking ridge that mates with a tapered locking depression on an opposed socket to prevent separation of the segments when assembled around a shaft and to hold the assembly for installation of fasteners;
   each flange having an axially extending fastener hole mating with a paired, similar hole in the opposed flange;
   a fastener extending between each paired fastener hole.

3. A two piece power transmission component manufactured in segments for convenient assembly around a shaft near the surface of a machine, comprising:
   a first segment and second segment;
   the two segments forming when mated a continuous toothed power transmission component outer periphery;
   a transverse web extending across each segment to form a central, shaft receiving opening;
   a pair of fastener flanges, having a thickness less than that of the associated segments, extending outwardly from the transverse web of each segment between the central opening and the outer periphery, each flange having a planar surface and at least one transverse surface to overlap with a mating flange of an opposed segment to axially and transversely align the segments;
   a pair of sockets on each segment to receive a mating fastener flange and form plural thrust faces to transmit load and torque;
   each flange having an axially extending fastener hole mating with a paired, similar hole in the opposed flange;
   the sockets including a tapered axially extending locking ridge that mates with a tapered locking depression on an opposed socket to prevent separation of the segments when assembled around a shaft and to hold the assembly for installation of fasteners;
   a bolt assembled in each paired fastener hole;
   each segment having recesses to mate with opposed recesses on the mating segment to receive the bolt head to prevent protrusion beyond the outer surface of the segments.

* * * * *